United States Patent
Kim et al.

(10) Patent No.: US 6,532,221 B1
(45) Date of Patent: Mar. 11, 2003

(54) HANDOFF METHOD OF MOBILE COMMUNICATIONS SYSTEMS

(75) Inventors: Hong Kim, Cheju-DO (KR); Chae-Hun Chung, Ichon-shi (KR)

(73) Assignee: Hyundai Electronics Co., Ltd., Kyonggi-do (KR)

( * ) Notice: Subject to any disclaimer, the term of this patent is extended or adjusted under 35 U.S.C. 154(b) by 0 days.

(21) Appl. No.: 09/290,952

(22) Filed: Apr. 13, 1999

(30) Foreign Application Priority Data

Apr. 17, 1998 (KR) .............................. 98-13793

(51) Int. Cl.[7] .............................. H04Q 7/20; H04Q 7/34; H04Q 7/38
(52) U.S. Cl. ................ 370/332; 455/436; 455/437; 455/438; 455/439; 455/443; 370/331
(58) Field of Search ................ 455/436, 437, 455/438, 439, 432, 422, 440, 441, 442, 443, 517, 513, 226.1, 226.2; 370/332, 331

(56) References Cited

U.S. PATENT DOCUMENTS

| | | | |
|---|---|---|---|
| 5,680,395 A | 10/1997 | Weaver, Jr. et al. ........ 370/332 |
| 6,049,716 A | * 4/2000 | Jung ........................... 370/332 |
| 6,061,337 A | * 5/2000 | Light et al. ................. 370/332 |
| 6,073,021 A | * 6/2000 | Kumar et al. .............. 370/332 |
| 6,075,989 A | * 6/2000 | Moore et al. .............. 370/332 |
| 6,160,999 A | * 12/2000 | Chheda et al. ............. 455/436 |

FOREIGN PATENT DOCUMENTS

| | | |
|---|---|---|
| JP | 9-284827 | 10/1997 |
| WO | PCT/US96/04158 | 3/1996 |
| WO | PCT/US98/02772 | 2/1998 |

* cited by examiner

Primary Examiner—William Trost
Assistant Examiner—Keith Ferguson
(74) Attorney, Agent, or Firm—Bryan Cave LLP

(57) ABSTRACT

A handoff method of a mobile communications system, in case that a cell is defined by a sector, wherein a handoff request is made to a base station having a predetermined level of pilot signal strength by using a pilot signal strength of a base station which is in service, a predetermined threshold value and pilot signal strength of neighboring base stations, so that a handoff is to be performed or not is decided after detecting pilot signal strengths of a mobile station and a base station which has been already connected, controlling the handoff generation number while preventing unnecessary load.

4 Claims, 4 Drawing Sheets

HANDOFF METHOD OF MOBILE COMMUNICATIONS SYSTEMS

BACKGROUND OF THE INVENTION

1. Field of the Invention

The present invention relates to a handoff method of mobile communications systems such as CDMA Code Division Multiple Access communications system, mobile communication system, PCS Personal Communications Service, and satellite communications system, and more particularly to, a handoff method of mobile communications system in which whether a handoff is to be performed or not is decided after detecting pilot signal strengths of a mobile station and a base station which has been already connected, so that it is possible to control a handoff generation number, preventing unnecessary load.

2. Description of the Conventional Art

In general, as shown in FIG. 1, a mobile communication system for communicating while movement is composed of mobile station 10 in which communication service of a mobile communication subscriber is requested and communication service of a mobile communication system is provided, base station 20 for exchanging signals with the mobile station 10 at a wireless area, control station 30 for control the base station 20 to perform signal process between the base station 20 and a switching station 40, and the switching station 40 which is connected to the control station 30 and performs switching connection between mobile communication nets, thereby connecting a mobile communication net with another communication net.

The operation of the general mobile communication system, which is constructed as above, is as follows.

When a mobile communication subscriber having a mobile station is in a service area of the base station 20 and requests a mobile communication service, the switching station 40 detects a position of the mobile station 10 under the control of the control base 30 and performs mobile communication service according to the request of the mobile station 10.

FIG. 2 shows boundary areas of base stations of a general mobile communications system.

An area in which communication service from one base station is possible is called a cell. The cell is defined by pilot signal strength, which is output through a pilot channel from the base station. Therefore, in case that a mobile station is positioned at a cell boundary, it is possible to realize a base station of which service area a mobile station belongs to by detecting an input pilot signal strength of the mobile station which is transmitted to the base station.

When the mobile station 10 is located in a service area of a first base station 21 and removes in a service area of a second base station 22, the communicating mobile 10 has to perform handoff to keep on the communication. Wherein the handoff means an operation to automatically convert communication line to keep the mobile station's communication when the mobile station removes from one cell to another cell.

FIG. 3 is a flow chart for explaining a handoff method of a conventional mobile communications system.

As shown in FIG. 3, the handoff method includes the steps of comparing a pilot signal strength, which is input from the mobile station to a neighboring base station, with a pilot detection threshold value (steps ST1–ST2), and transmitting handoff request message if the pilot signal strength of the neighboring base station is over than the pilot detection threshold value (step ST3–ST4).

Now the handoff method of the conventional mobile communications system will be described in more detail with reference to FIG. 1 and FIG. 2.

First, when the mobile station 10 is in the service area of the first base station 21 and served by the first base station 21, the pilot signal strength of the first base station 21 is detected and a signal detection message is transmitted from the mobile station 10 to the first base station 21.

The mobile station 10 approaches to a handoff area and, in step ST1, when the pilot signal strength of the second base station 22 among various pilot signal strengths is larger than the pilot detection threshold value, a signal detection message is transmitted to the first base station 21 for handoff to the second base station 22. The signal detection message includes information as to pilot off-set and the pilot signal strength for distinguishing the base stations 21 and 22.

In step ST2, the received signal detection message is transmitted to a base station controller by the first base station 21 and the pilot signal strength of the second base station 22 is compared with the pilot detection threshold value by the base station controller. In steps ST3 and ST4, a handoff to the second base station 22 is requested when the pilot signal strength of the second base station 22 is larger than the pilot detection threshold value, as a result of the comparison.

According to the handoff to be performed as above, it becomes possible to continuously communicate even when the mobile station 10 removes from the service area of the first base station 21 to that of the second base station 22.

However, the conventional communications system has disadvantages that the pilot signal strength of a base station which is serving the mobile station 10 is not considered so that unnecessary handoff may be caused, increasing handoff frequency, even in case that the pilot signal strength of the base station currently serving the mobile station 10 is larger than the mobile station requires for communication.

Further, as the handoff generation frequency increases, unnecessary overload is applied to the mobile communications system.

SUMMARY OF THE INVENTION

Therefore, the present invention is derived to resolve the disadvantages of the conventional techniques and it is an object of the present invention to provide a handoff method of a mobile communications system wherein, in case that a cell is defined by a sector, it is decided whether a handoff is to be performed or not after detecting pilot signal strengths of a mobile station and a base station which is already connected to the mobile station and then detecting pilot signal strengths of neighboring base stations, so that handoff generation frequency is efficiently controlled, preventing unnecessary overload of the system.

It is another object of the present invention to provide a handoff method of a mobile communications system wherein, in case that a cell is defined by a plurality of sectors, it is decided whether a handoff is to be performed or not after detecting a pilot signal strength of a sector which is in service and then detecting pilot signal strengths of neighboring sectors, so that handoff generation frequency is efficiently controlled, preventing unnecessary overload of the system.

In order to achieve the above objects of the present invention, according to an aspect of the present invention, a handoff method of a mobile communications system, in which a cell is defined by a sector, characterized in that a handoff request is made to a base station having a predetermined level of pilot signal strength by using a pilot signal strength of a base station which is in service, a predetermined threshold value and pilot signal strength of neighboring base stations.

In order to achieve the above objects of the present invention, according to another aspect of the present invention, a handoff method of a mobile communications system, in which a cell is defined by a sector, includes a first step of receiving a signal detection message from a mobile station and comparing a pilot signal strength of a base station which is in service with a threshold value for pilot checking of neighboring base stations, a second step of determining that the neighboring base stations are required to be checked their pilot signal strengths if the pilot signal strength of the base station which is in service is smaller than the threshold value for checking pilot of neighboring base stations, and comparing the pilot signal strength of the base station which is in service with pilot signal strengths of the neighboring base stations, and a third step of distinguishing a pilot signal strength of a predetermined level among the pilot signal strengths of the neighboring base stations if the pilot signal strength of the base station which is in service is smaller than the pilot signal strengths of the neighboring base stations, and transmitting a message for requesting a handoff to a neighboring base station which has the distinguished pilot signal strength.

In order to achieve the above objects of the present invention, according to another aspect of the present invention, a handoff method of a mobile communications system, in which a cell is defined by a plurality of sectors, includes a first step of detecting a sector corresponding to a predetermined level of pilot signal strength by using pilot signal strength of a sector which is in service, a predetermined threshold value and a pilot signal strength of other sectors, and determining whether the found sector belongs to a base station which is currently in service, and a second step of requesting a handoff between sectors in the base station which is currently in service if the found sector belongs to the base station in service, while requesting a handoff to another sector of neighboring base stations if the found sector does not belongs to the base station in service.

BRIEF DESCRIPTION OF THE DRAWINGS

The present invention will become more fully understood from the detailed description given hereinbelow accompanying drawings which are given by way of illustration only, and thus are not limitative of the present invention, and wherein.

DETAILED DESCRIPTION OF THE INVENTION

A handoff method of a mobile communications system, according to embodiments of the present invention will be explained with reference to FIG. 4 and FIG. 5.

Figure 4:
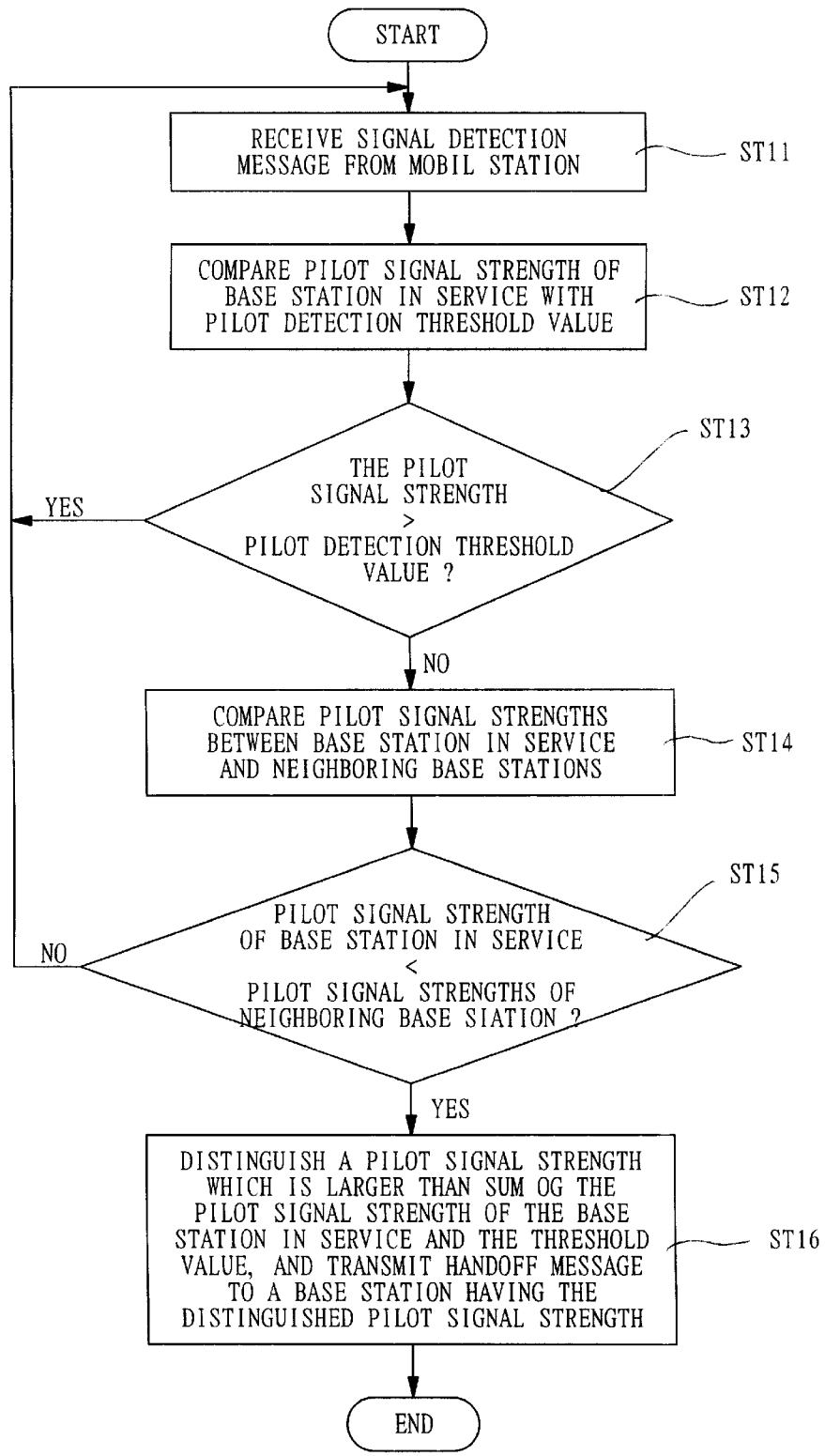
FIG. 4 is a flow chart for explaining a handoff method in case that a cell is defined by a sector in a mobile communications system according to an embodiment of the present invention.

FIG. 4 is a flow chart for explaining a handoff method in case that a cell is defined by a sector in a mobile communications system according to an embodiment of the present invention.

As shown in FIG. 4, a handoff method of a mobile communications system, in which a cell is defined by a sector, includes an own pilot signal examination step of receiving a signal detection message from a mobile station and comparing a pilot signal strength of a base station which is in service with a threshold value for pilot checking of neighboring base stations (steps ST11–ST12), a neighboring pilot signal examination step of determining whether the neighboring base stations are required to check their pilot signal strengths if the pilot signal strength of the base station which is in service is smaller than the threshold value for checking pilot of neighboring base stations, and comparing the pilot signal strength of the base station which is in service with pilot signal strengths of the neighboring base stations (steps S13–S14), and a handoff requesting step of distinguishing a pilot signal strength of a predetermined level among the pilot signal strengths of the neighboring base stations if the pilot signal strength of the base station which is in service is smaller than the pilot signal strengths of the neighboring base stations, and transmitting a message for requesting a handoff to a neighboring base station which has the distinguished pilot signal strength (steps ST15–ST16).

Figure 5:
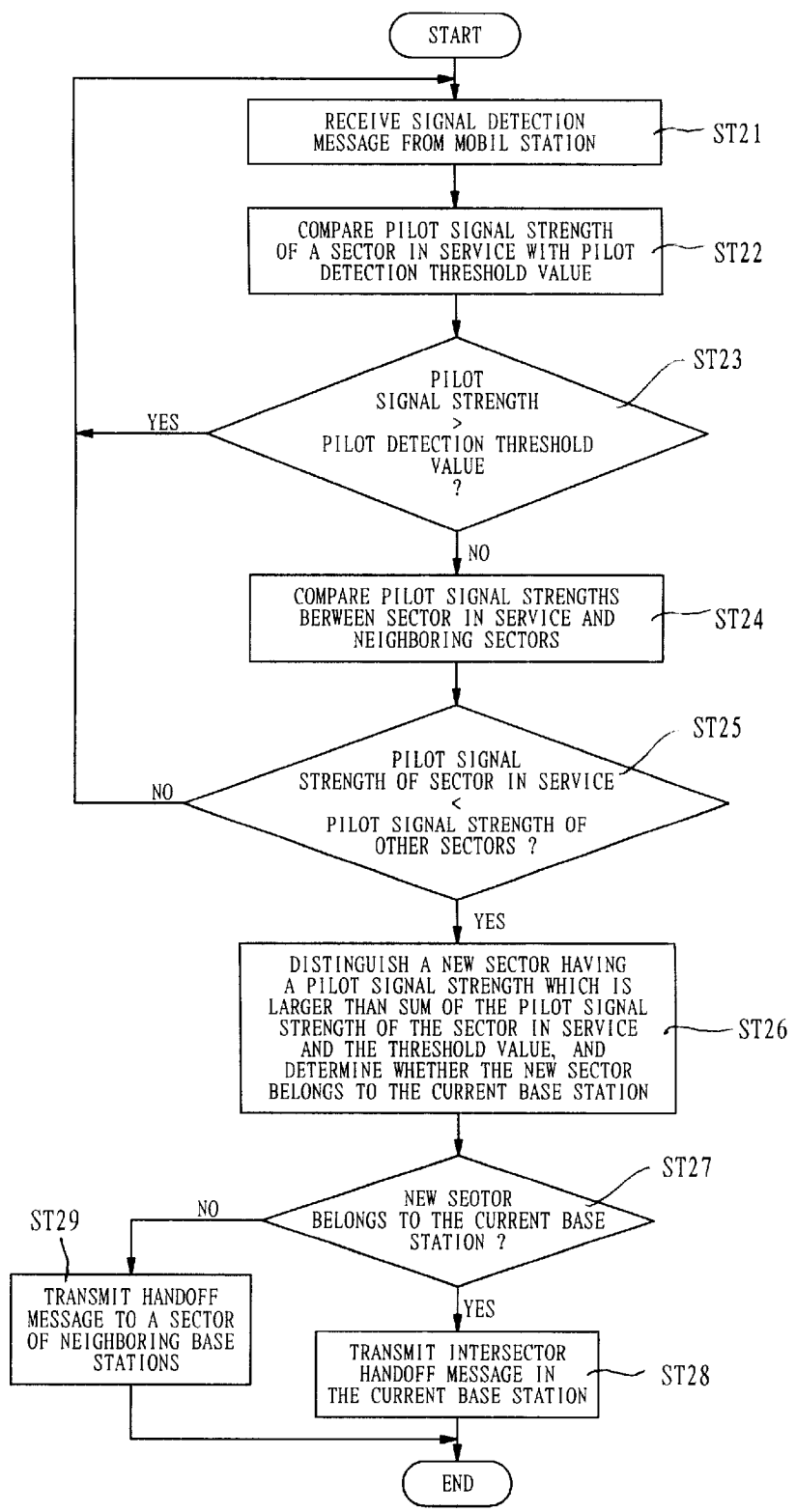
FIG. 5 is a flow chart for explaining a handoff method in case that a cell is defined by a plurality of sectors in a mobile communications system according to another embodiment of the present invention.

FIG. 5 is a flow chart for explaining a handoff method in case that a cell is defined by a plurality of sectors in a mobile communications system according to another embodiment of the present invention.

As shown in FIG. 5, a handoff method of a mobile communications system, in which a cell is defined by a plurality of sectors, includes an own pilot signal examination step of comparing pilot signal strength of a sector which is in service with a threshold value for pilot-checking of neighboring sectors, when a signal detection message is received from a mobile station (steps ST21–ST22), a neighboring pilot signal examination step of determining whether the neighboring sectors are to be checked their pilot signal strength if the pilot signal strength of the sector which is currently in service is smaller than the threshold value for checking pilot of neighboring sectors, and comparing the pilot signal strength of the sector which is in service with pilot signal strengths of the neighboring sectors (steps ST23–ST24), an own base station examination step of distinguishing a pilot signal strength, which is larger than a sum of the pilot signal strength of the sector which is currently in service and the threshold value, among the pilot signal strengths of the neighboring sectors if the pilot signal strength of the sector which is in service is smaller than the pilot signal strengths of the neighboring sectors, and determining whether a sector having the found pilot signal strength belongs to the base station which is currently in service (steps ST25–ST26), a domestic handoff requesting step of transmitting a handoff requesting message between sectors in the base station which is currently in service if the found sector belongs to the base station in service (steps ST27–ST28), and a foreign handoff requesting step of transmitting a handoff requesting message into another sector of neighboring base stations if the found sector does not belongs to the base station in service (step S29).

The handoff method of a mobile communications system according to embodiments of the present invention will be explained in more detail hereinafter.

Figure 1:
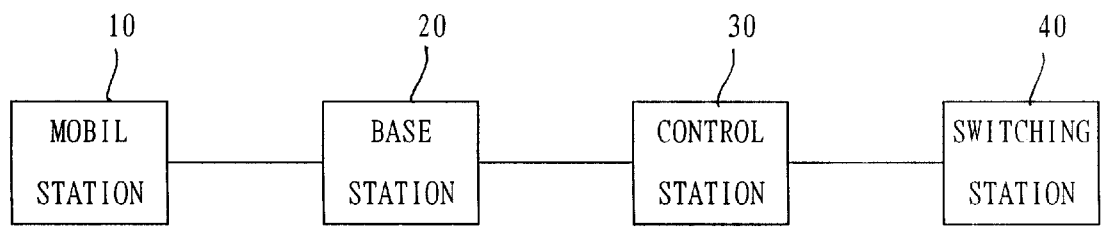
FIG. 1 is a schematic block diagram showing a general mobile communications system.
Figure 2:
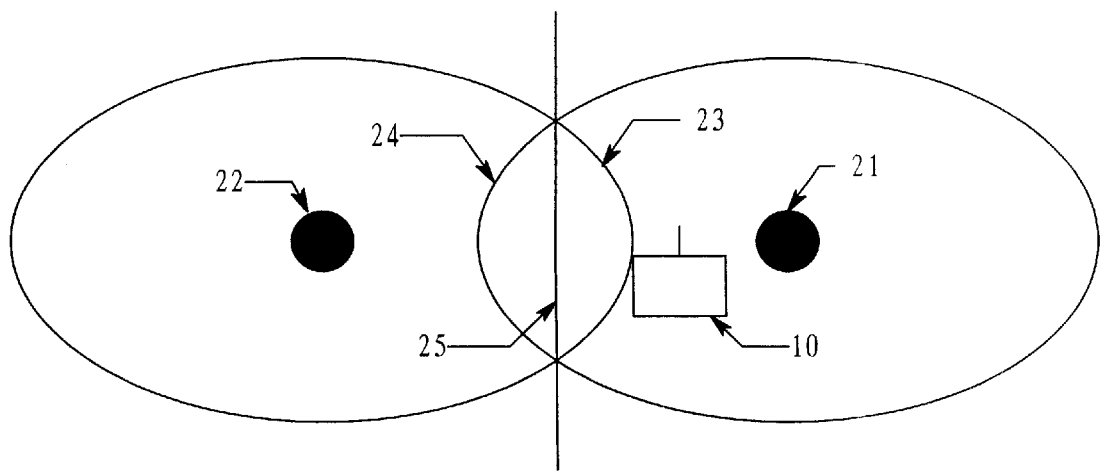
FIG. 2 is a schematic view showing boundary areas of base stations of a general mobile communications system.
Figure 3:
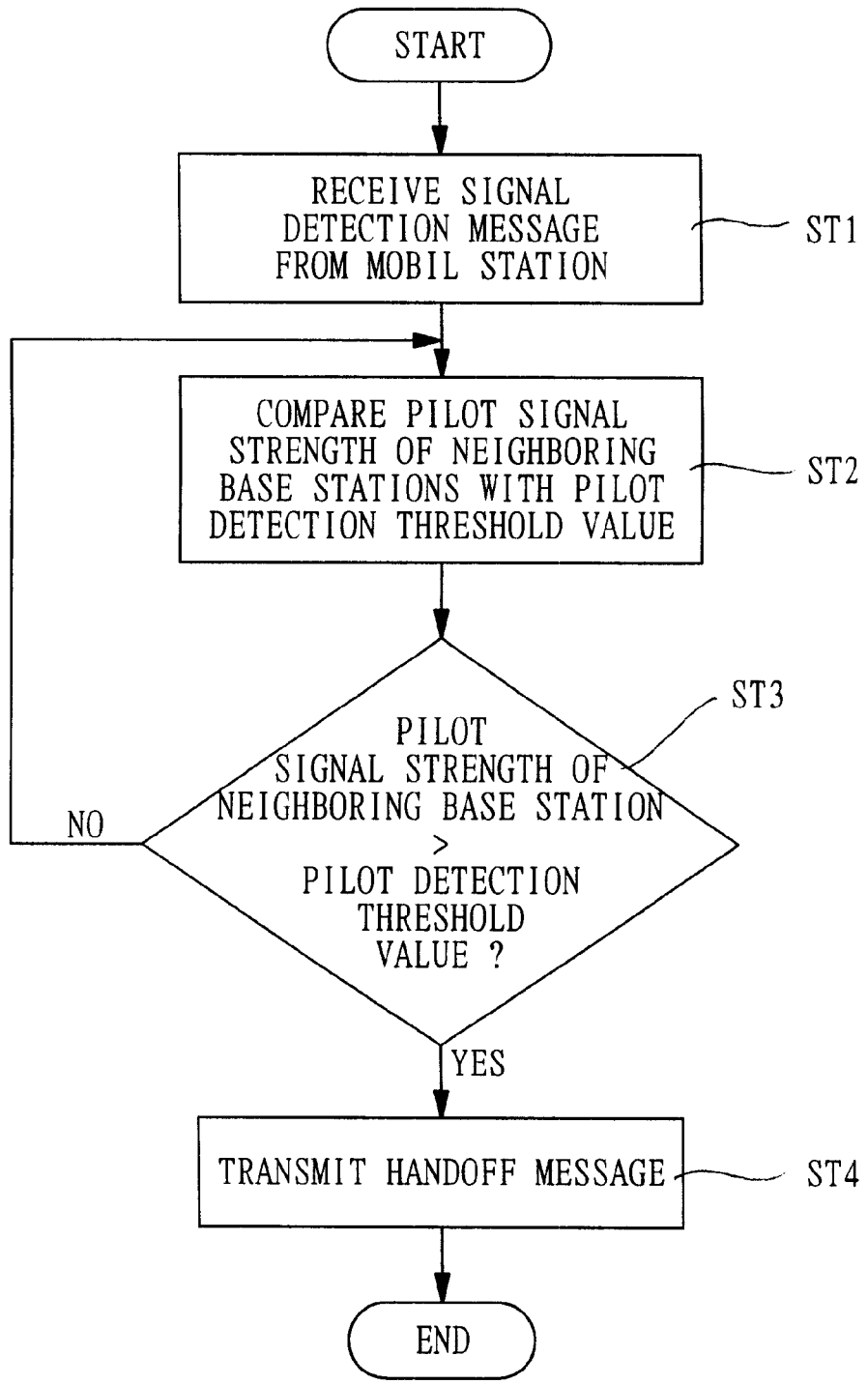
FIG. 3 is a flow chart for explaining a handoff method of a conventional mobile communications system.

Referring to FIG. 1, the pilot signal strength which is received from the first base station 21 by the mobile 10 at a handoff boundary 25 is equal to that of the second base station 22 and the pilot signal strength which is received from the first base station 21 by the mobile 10 at a cell boundary is larger than that of the second base station 22 by a predetermined value. Therefore, the position of the mobile station 10 may be recognized by comparing the pilot signal strength of the first base station 21, to which the mobile station 10 belongs, with the second base station 22.

The service area of a base station is defined by only one cell and may be divided into a plurality of sectors. Softer handoff is performed between sectors of the same base station. A control station for base stations controls a plurality of base stations and a soft handoff is performed between different base stations within one control station for base stations.

A handoff method in case that a cell is not divided into a plurality of sectors and defined by one sector will be described with reference to FIG. 4.

After a signal detection message is received from a mobile station in step S11, a pilot signal strength of a base station, which is connected to the mobile station and provides communication service to the mobile station, is compared with a threshold value which is set for checking pilot signal strengths of neighboring base stations in step S12.

As a result of the comparison, if the pilot signal strength of the base station, which connected to the mobile station and provides communication service to the mobile station, is larger than the threshold value which is set for checking pilot signal strengths of neighboring base stations, handoff to a new base station is not performed. According to this method, it becomes possible that generation of unnecessary handoff is prevented when the pilot signal strength of the base station, which is currently in service, is sufficient for communication.

To the contrary, as a result of the comparison, if the pilot signal strength of the base station in service is smaller than the threshold value, it is determined that it is necessary to check pilot signal strength of neighboring base station. Therefore, the pilot signal strength of the base station in service is compared with pilot signal strengths of the neighboring base stations.

If the pilot signal strength of the base station in service in steps S15–S16 is smaller than the pilot signal strengths of the neighboring base stations, it is distinguished a pilot signal strength, which is larger than a sum of the pilot signal strength of the base station which is currently in service and the threshold value which is set for checking pilot signal strengths of the neighboring base stations, among the pilot signal strengths of the neighboring base stations. After that, a handoff message to a corresponding base station to the distinguished pilot signal strength is transmitted to the control station.

As above, according to the present invention, before examining the pilot signal strengths of the neighboring base stations for handoff determination, the pilot signal strength of the base station which is currently in service is examined to determine whether the examination of the pilot signal strengths of the neighboring base stations is necessary or not, thereby unnecessary handoff is prevented in advance.

Now, a handoff method of a mobile communications system, in which a cell is defined by a plurality of sectors, will be described in more detail.

After a signal detection message is received from a mobile station, pilot signal strength of a sector, which is in service, is compared with a threshold value for pilot checking of neighboring sectors in steps ST21–ST22. As a result of the comparison, if the pilot signal strength of the sector, which is currently in service, is larger than the threshold value for checking pilot of neighboring sectors, handoff to a new sector is not attempted. Therefore, if the pilot signal strength of the sector, which is currently in service, is larger than required for communication, it is possible to prevent unnecessary handoff operation.

On the other hand, as a result of the comparison, if the pilot signal strength of the sector which is in service is smaller than the pilot signal strengths of the neighboring sectors, it is determined that it is necessary to check pilot signal strengths of the neighboring sectors. Therefore, the pilot signal strength of the sector in service is compared with the pilot signal strengths of the neighboring sectors in steps ST23–ST24.

If the pilot signal strength of the sector in service is smaller than the pilot signal strengths of the neighboring sectors, it is distinguished a pilot signal strength, which is larger than a sum of the pilot signal strength of the sector currently in service and the threshold value set for determining handoff, among the pilot signal strengths of the neighboring sectors. After that, a corresponding sector having the distinguished pilot signal strength is obtained and it is determined whether this sector belongs to the current base station or not.

During the procedure for obtaining the sector for handoff, the reason considering the sum of the pilot signal strength of the sector is currently in service and the threshold value set for determining handoff is to accurately determine whether the pilot signal strengths of the neighboring sectors have been larger temporarily or necessarily for handoff.

If this obtained sector belongs to the current base station, a message requesting handoff between sectors is transmitted to the control station in steps ST27–ST28. Further, a message for requesting a handoff into another sector of neighboring base stations is transmitted to the control station if the found sector does not belongs to the base station in service in step S29.

EFFECT OF THE INVENTION

As above, according to the present invention, before examining the pilot signal strengths of the neighboring base stations for handoff determination, the pilot signal strength of the base station which is currently in service is examined to determine whether the examination of the signal strengths of the neighboring base stations is necessary, thereby unnecessary handoff is prevented in advance.

As described hereinabove, according to the present invention, in case that a cell is defined by a plurality of sections, a handoff is to be performed or not is decided after detecting pilot signal strengths of a mobile station and a base station which has been already connected, so that it is possible to control a handoff generation number, preventing unnecessary load.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A handoff method of a mobile communications system, in which a cell is defined by a sector, comprising:
    a first step of receiving a pilot detection message from a mobile station and comparing an input pilot signal strength of a base station which is in service with a threshold value for pilot-checking of neighboring base stations;

a second step of determining that the neighboring base stations are required to check their pilot signal strength if the input pilot signal strength of the base station which is in service is smaller than the threshold value for checking pilot of neighboring base stations, and comparing the pilot signal strength of the base station which is in service with pilot signal strengths of the neighboring base stations; and a third step of distinguishing a pilot signal strength of a predetermined level among the pilot signal strengths of the neighboring base stations if the pilot signal strength of the base station which is in service is smaller than the pilot signal strengths of the neighboring base stations, and transmitting a message to requesting handoff to a corresponding base station which has the distinguished pilot signal strength.

2. A handoff method of a mobile communications system according to claim 3, wherein the pilot signal strength of the predetermined level in the third step is larger than a sum of the pilot signal strength of the base station which is in service and the threshold value for determining whether it is necessary to perform a handoff or not.

3. A handoff method of a mobile communications system, in which a cell is defined by a plurality of sectors, comprising:

a first step of detecting a sector corresponding to a predetermined level of pilot signal strength by using pilot signal strength of a sector which is in service, a predetermined threshold value and a pilot signal strength of other sectors, and determining whether the found sector belongs to a base station which is currently in service, the first step comprising:

a first sub-step of comparing an input pilot signal strength of a base station which is in service with a threshold value for pilot-checking of neighboring base stations, when a signal detecting message is received from a mobile station;

a second substep of determining that the neighboring base stations are required to check their pilot signal strength if the pilot signal strength of the base station which is in service is smaller than the threshold value for checking pilot of neighboring base stations, and comparing the pilot signal strength of the base station which is in service with pilot signal strengths of the neighboring base stations; and a third sub-step of distinguishing a pilot signal strength of a predetermined level among the pilot sigaal strengths of the neighboring base stations if the pilot signal strength of the base station which is in service is smaller than the pilot signal strengths of the neighboring base stations, and determining whether a sector having the found sector belongs to the base station which is currently in service; and a second step of obtaining handoff between sectors in the base station which is currently in service if the found sector belongs to the base station in service, while obtaining handoff into sectors in the neighboring base station if the found sector does not belong to the base station in service.

4. A handoff method of a mobile communications system according to claim 3, wherein the pilot signal strength of the predetermined level in the third sub-step is larger than a sum of the pilot signal strength of the base station which is in service and the threshold value.

* * * * *